US007861892B1

(12) United States Patent
White et al.

(10) Patent No.: US 7,861,892 B1
(45) Date of Patent: Jan. 4, 2011

(54) PORTABLE DRAFT BAR

(76) Inventors: Richard W. White, White's Marine 846 No. Dixie Hwy., Lantana, FL (US) 33462; Robert J. White, White's Marine 846 No. Dixie Hwy., Lantana, FL (US) 33462

( * ) Notice: Subject to any disclaimer, the term of this patent is extended or adjusted under 35 U.S.C. 154(b) by 482 days.

(21) Appl. No.: 12/082,435

(22) Filed: Apr. 10, 2008

Related U.S. Application Data

(60) Provisional application No. 61/068,060, filed on Mar. 4, 2008.

(51) Int. Cl.

| | |
|---|---|
| ***B67D 1/16*** | (2006.01) |
| ***B67D 7/80*** | (2006.01) |
| ***B67D 7/78*** | (2006.01) |
| ***B67D 7/84*** | (2006.01) |
| ***F25D 3/00*** | (2006.01) |
| ***F25D 3/08*** | (2006.01) |
| ***B60P 3/22*** | (2006.01) |

(52) U.S. Cl. .................... 222/108; 222/146.6; 222/131; 222/182; 222/539; 222/608; 222/183; 222/129.1; 222/538; 222/540; 62/398; 62/400; 62/457.4; 62/389; 62/326

(58) Field of Classification Search .................. 62/389, 62/398, 400, 457.4, 457.5, 326; 222/610, 222/146.6, 108, 182–183, 131, 538–540, 222/129.1, 608; 312/140.2, 229
See application file for complete search history.

(56) References Cited

U.S. PATENT DOCUMENTS

| | | | | |
|---|---|---|---|---|
| 3,232,489 | A * | 2/1966 | Buffington | 222/108 |
| 3,327,902 | A * | 6/1967 | Alterwitz | 222/108 |
| 4,481,791 | A * | 11/1984 | German | 62/400 |
| 5,079,927 | A | 1/1992 | Rodino | |
| 5,339,986 | A | 8/1994 | Mihalich | |
| 5,915,602 | A | 6/1999 | Nelson | |
| 5,996,842 | A | 12/1999 | Riley | |
| 6,010,043 | A | 1/2000 | Williamson | |
| 6,481,238 | B1 | 11/2002 | Jennings | |
| 6,502,415 | B2 | 1/2003 | Chiusolo | |
| 6,637,224 | B2 | 10/2003 | Chiusolo | |
| 7,086,566 | B2 | 8/2006 | Goepfert | |
| 7,237,390 | B1 * | 7/2007 | Nelson | 62/3.64 |

* cited by examiner

*Primary Examiner*—Frantz F Jules
*Assistant Examiner*—Cassey Bauer
(74) *Attorney, Agent, or Firm*—Alvin S. Blum

(57) ABSTRACT

A portable draft bar has an insulated chamber with an open top, an insulated cover for the open top, and a horizontal shoulder on the inside wall near the top. A rigid panel fits on the shoulder. At least one beverage tap mounted on the panel extends above the open top, with a drip tray below the tap outlet. A cooling coil within the chamber connects the tap inlet to a pressurized beverage container, with chamber ice cooling the coil. When not in use, the panel may be inverted and returned to the shoulder. With the cover in place and the container disconnected, the device is secure and transportable.

8 Claims, 6 Drawing Sheets

PORTABLE DRAFT BAR

Applicants claim the benefit of provisional patent application No. 61/068,060 filed Mar. 4, 2008, incorporated herein by reference.

FIELD OF THE INVENTION

This invention relates to self-contained portable apparatus for dispensing beverages from a pressurized container used for bartending and more specifically to apparatus using ice as the coolant for the beverage.

BACKGROUND OF THE INVENTION

Portable draft boxes and bars for dispensing cold beverages are well known in the art, as exemplified by U.S. Pat. Nos. 5,339,986 issued Aug. 23, 1994 to Mihalich; 1,772,111 issued Aug. 5, 1930 to Rice; 6,481,238 issued Nov. 19, 2002 to Jennings; and 5,915,602 issued Jun. 29, 1999 to Nelson. They are large and cumbersome with space for a keg, and generally requiring rollers for transport. The taps are often positioned for easy damage in transport. Many include a refrigeration compressor requiring electrical connection.

SUMMARY OF THE INVENTION

It is accordingly an object of the invention to provide a self-contained portable apparatus for dispensing beverages from one or more pressurized containers that may be used for bartending using ice for coolant that is easily carried about. The beverage most commonly used will be beer although other beverages may be employed as well. They are most often employed at gatherings where a permanent bar would not be available. The apparatus includes a flat rigid panel that is dimensioned to fit on the inner shoulder of an insulated cooler having a hinged and/or removable insulated cover. At least one tap tower is affixed to the panel with tubing extending through a hole in the panel to connect with the outlet of a cooling coil or plate in the ice filled cooler. An inlet to the cooling coil or plate is connected to a pressurized beverage container such as a beer keg that is outside the cooler. A perforated drip tray is also provided on the panel with a pan carrying the drippings to a tube under the panel. The drip tray and pan is positioned below the tap(s) to catch all the drips that would otherwise contaminate the dispensing area. The term tap is used here to designate any of the faucets, valves and spigots used to dispense liquids. Another opening with removable cover is provided in the panel to permit access to the ice chamber below. The panel and its accessories are dimensioned and constructed so that the panel may be lifted up, inverted, and again rested on the inner shoulder of the cooler, to enable the insulated cover of the cooler to close. This facilitates safe transport and avoids melting of the ice.

These and other objects, features, and advantages of the invention will become more apparent from the detailed description of exemplary embodiments thereof as illustrated in the accompanying drawings, in which like elements are designated by like reference characters in the various drawing figures.

DETAILED DESCRIPTION OF PREFERRED EMBODIMENTS

Figure 1:
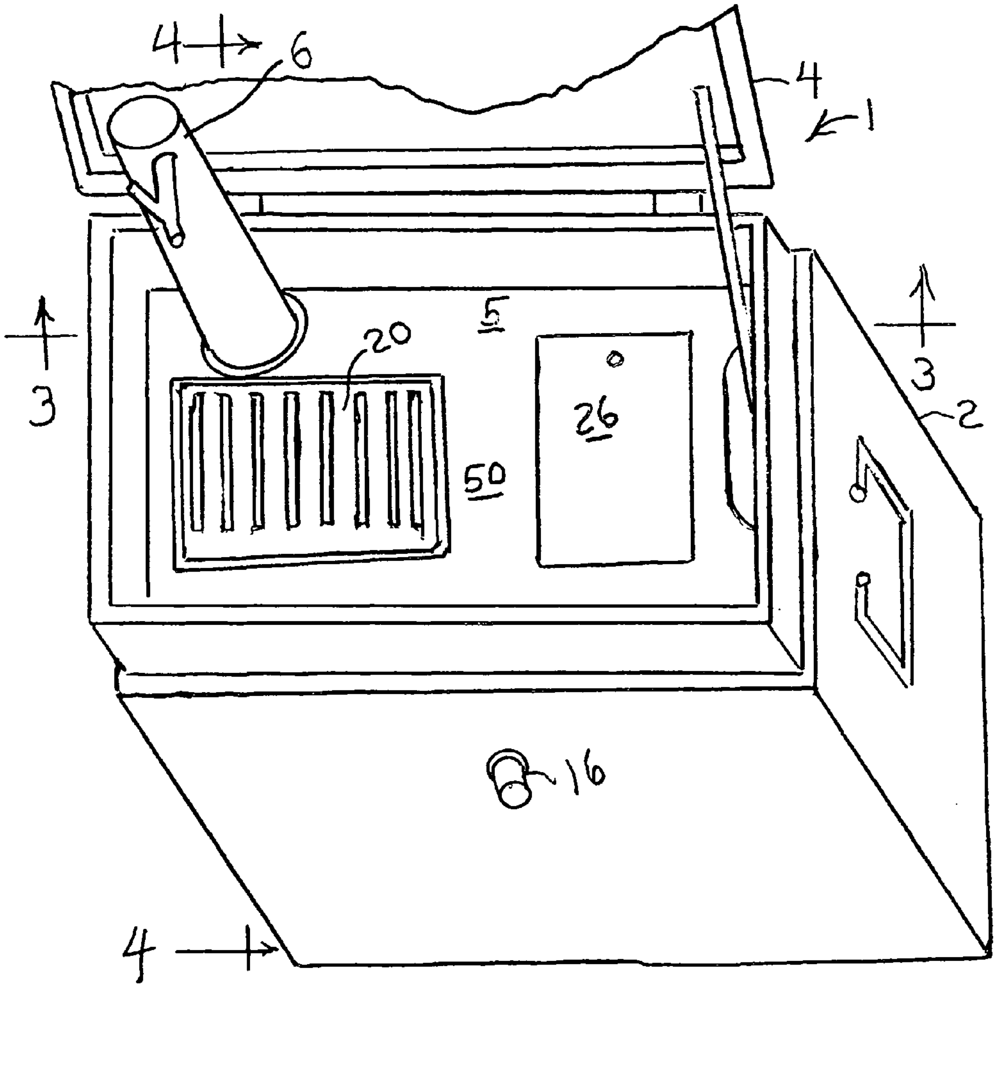
FIG. 1 is a perspective view of the invention with cover open ready for use.
Figure 2:
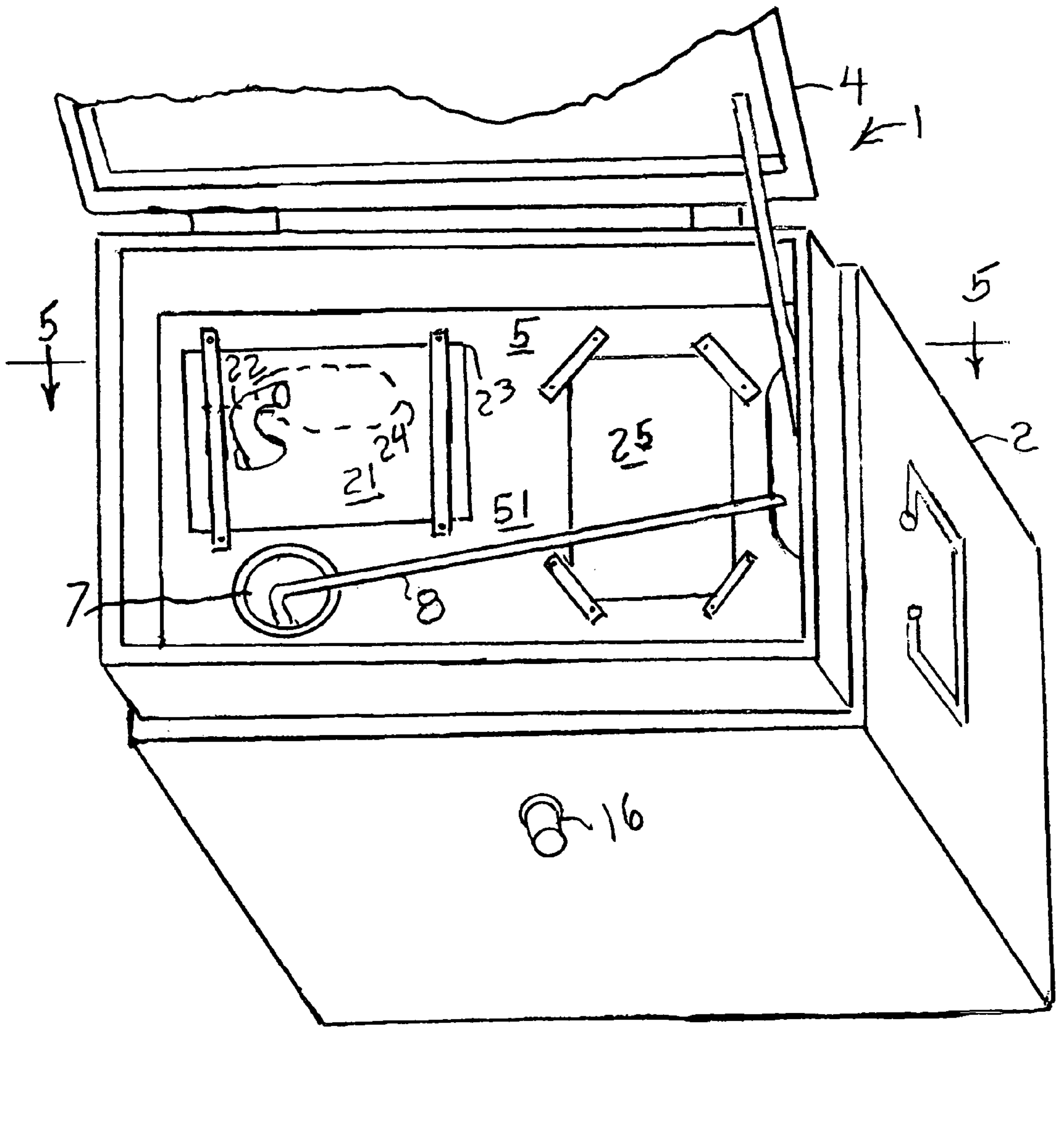
FIG. 2 is a perspective view with panel inverted for transport.
Figure 5:
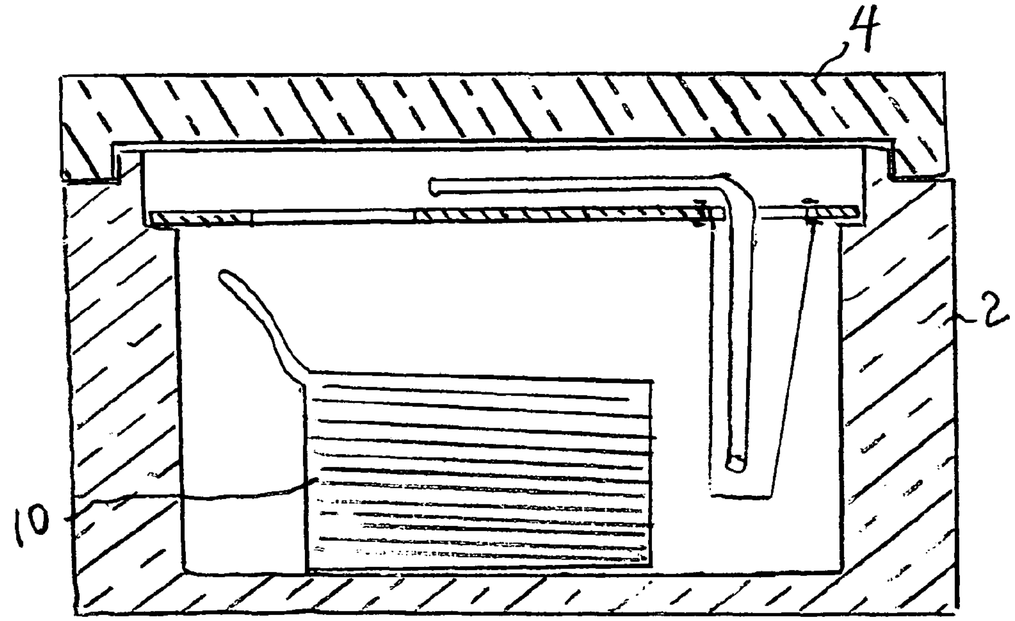
FIG. 5 is a sectional view through line 5-5 of FIG. 2.
Figure 3:
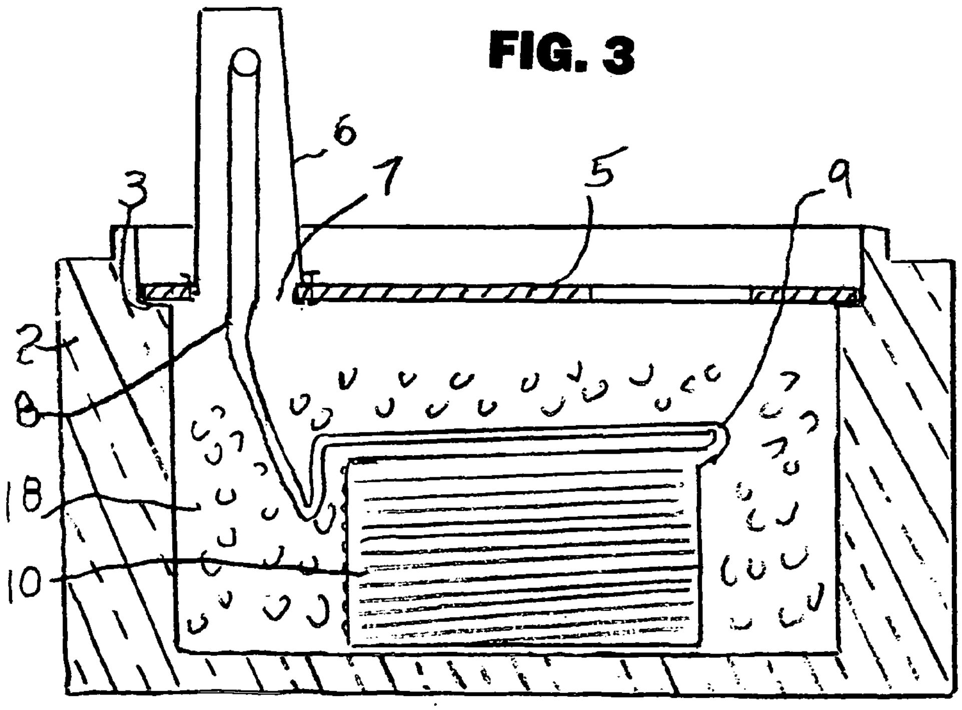
FIG. 3 is a sectional view through line 3-3 of FIG. 1.
Figure 4:
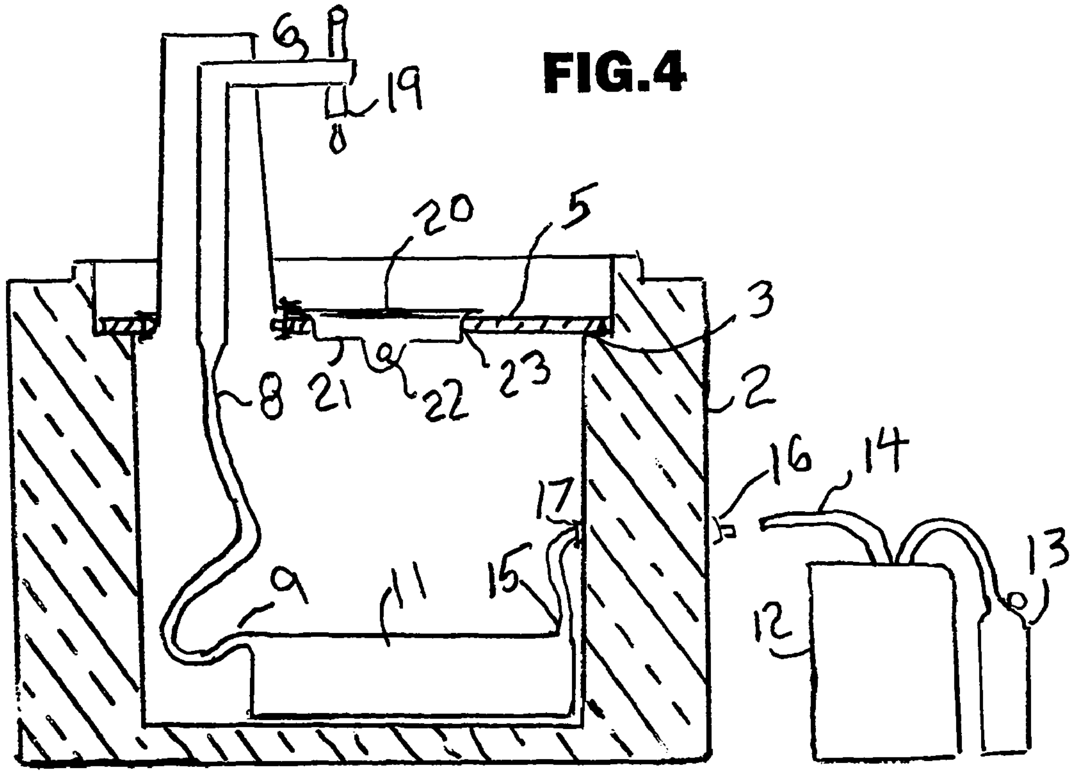
FIG. 4 is a sectional view through line 4-4 of FIG. 1.

Referring now to the drawing FIGS. 1-5, a preferred embodiment of the invention 1 is shown. A flat rigid panel 5 has broad first face 50 and opposed second face 51, and is dimensioned to fit on the inner shoulder 3 of insulated cooler 2 that has an insulated hinged cover 4. A tap tower 6 of a type well known in the art is affixed to first face 50 of panel 5 with an opening 7 in the panel to pass inlet tube 8 of the tower through the panel and to the output 9 of cooling coil 10, or alternatively a cooling plate 11. A beverage container 12, such as a beer keg, is pressurized by pressure source 13 such as carbon dioxide or compressed air. The container 12 has a feed tube 14 that connects to a through-wall connector 16 to tube 17 that connects to the inlet 15 of the cooling coil or cooling plate. The cooling plate or coil is immersed in the ice and water 18 in the cooler to cool the beverage as it passes from the container 12 to the outlet 19 of the tap and into the pitcher or glass. There is often a drip or overflow in the dispensing process. The apparatus provides for means to catch these drips and overflows so as to keep the environment clean and dry. A perforated tray 20 is mounted over a receiving pan 21 mounted in an opening 23 in the panel. A tube 22 at the bottom of pan 21 extends past the second face 51. It is removably sealed to a bag 24, shown in phantom, to receive the waste. Another aperture 25 in the panel is large enough to permit access to retrieve items such as cooling cans and bottles. It also permits access to add or remove ice as desired. The aperture 25 is covered by removable cover 26. The panel 5 may be lifted out, inverted and replaced on the inner shoulder 3 of the cooler, as best seen in FIGS. 2 and 5, with the second face uppermost. The insulated cover 4 may then be closed to prevent ice melting and provide for a more convenient and secure storage and/or transport when the tube 14 connecting to the container 12 is disconnected.

Figure 6:
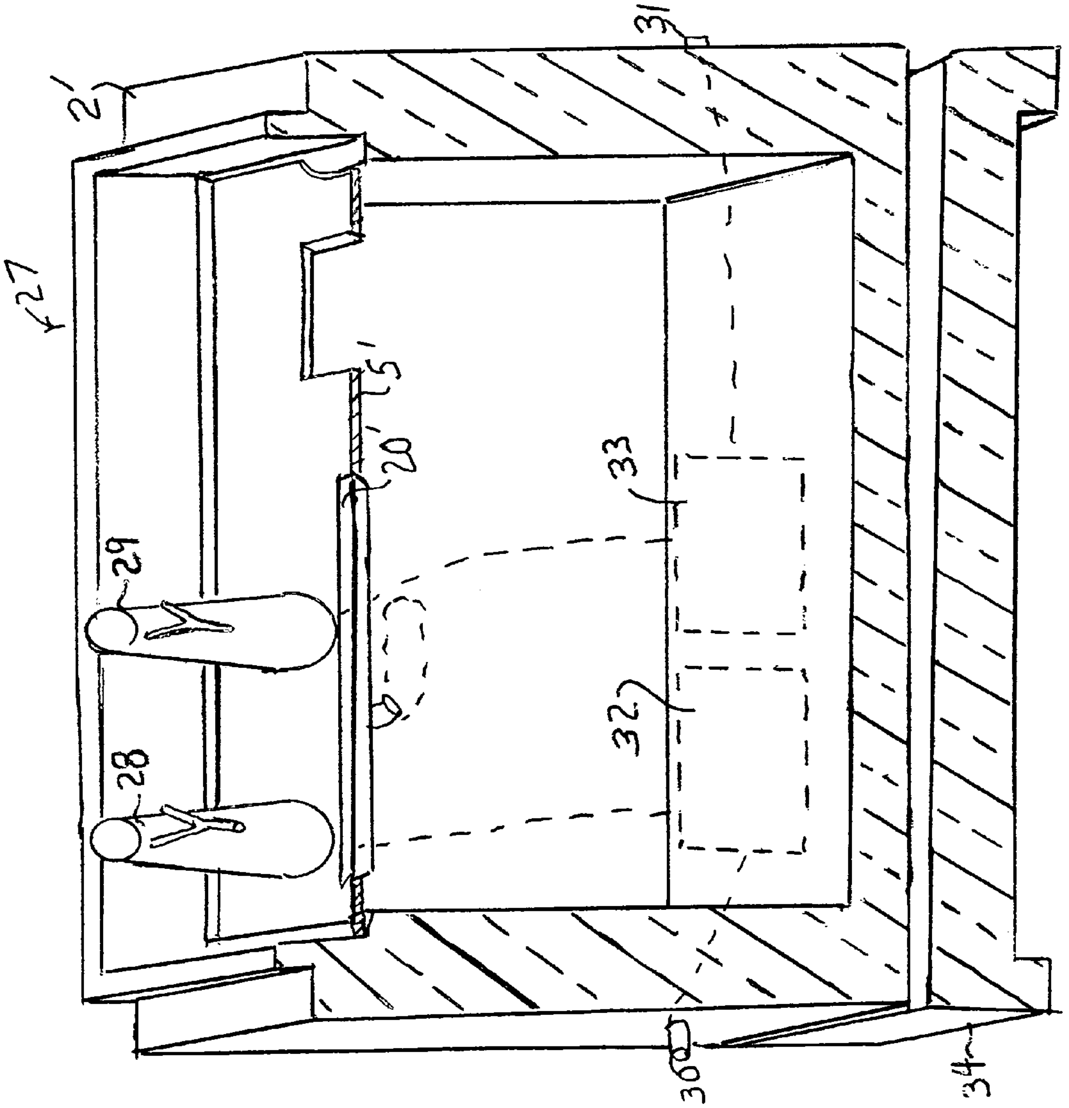
FIG. 6 is a perspective view, partially cut away, of another embodiment with two taps.

Referring now to FIG. 6, another embodiment 27 of the invention is shown for dispensing two different beverages from two different pressurized containers or kegs. A first tap tower 28 is connected through a first cooling coil 32 (shown in phantom) within the cooler 2' to first keg connector 30. A second tap tower 29 is connected through a second cooling coil 33 (shown in phantom) to a second keg connector 31. The perforated tray 20' is long enough to catch drips from both taps. The insulated cover 34 has been removed from the cooler 2' and is placed under the cooler to be ready for use when the panel 5' is inverted.

Figure 7:
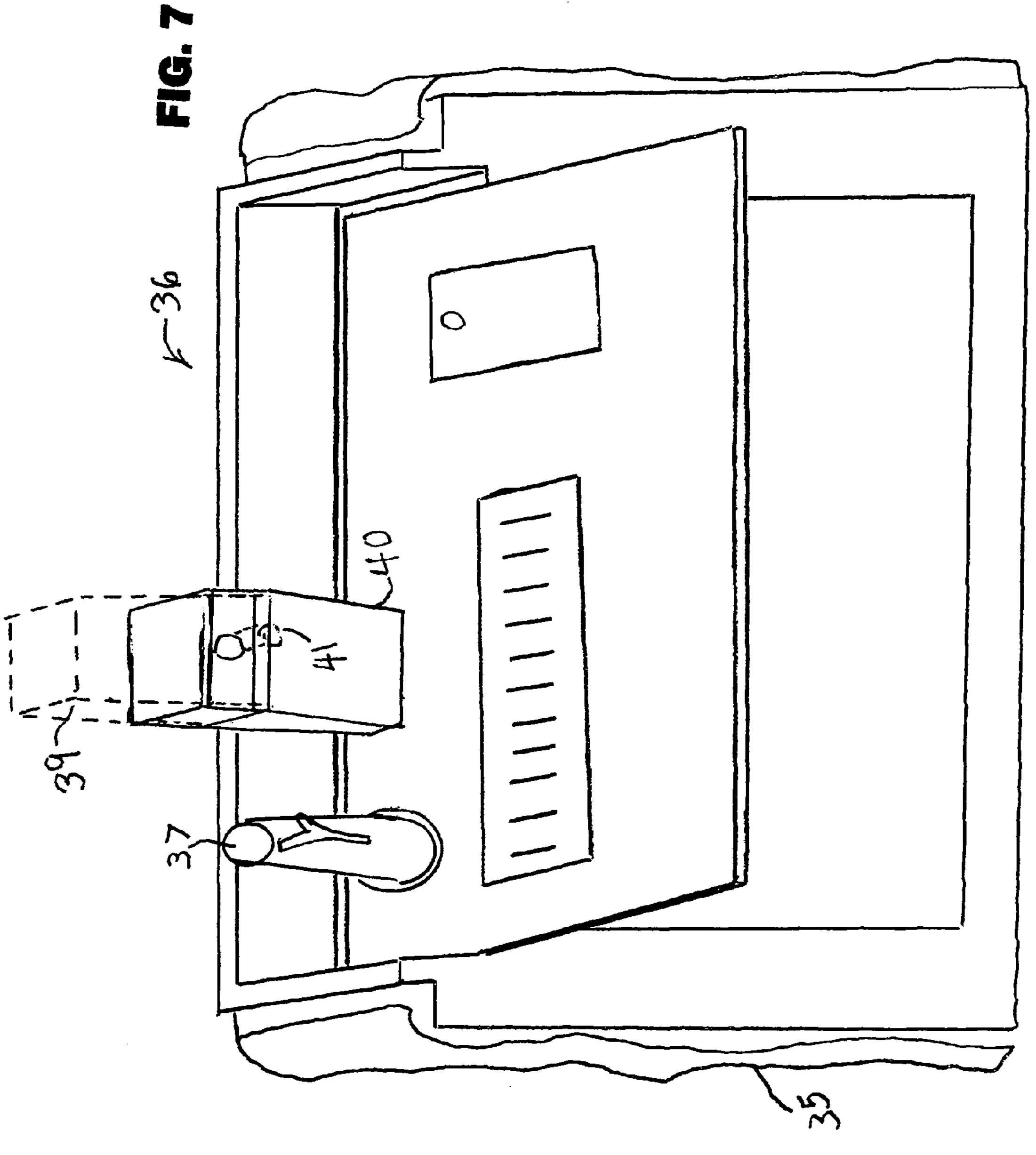
FIG. 7 is a perspective view, partially cut away, of another embodiment of the invention.

Referring now to FIG. 7, another embodiment 36 of the invention is shown for dispensing two different beverages, a pressurized and cooled beverage, such as beer from tap 37, and wine from wine tap 41 flowing by gravity from wine box 39 (shown in phantom) removably held in wine box support 40. A skirt 35 may be provided that covers the sides of the cooler. It may be decorative and embellished with logos, advertising, and the like.

While we have shown and described the preferred embodiments of our invention, it will be understood that the invention may be embodied otherwise than as herein specifically illustrated or described, and that certain changes in form and arrangement of parts and manner of practicing the invention may be made within the underlying idea or principles of the invention.

The invention claimed is:

1. A portable draft bar comprising:

an insulated chamber having an open top, insulated side walls, and an insulated bottom;

an insulated top for covering the open top;

a horizontal shoulder extending around the inside of the side walls near the open top;

a rigid panel dimensioned to removably fit inside the chamber supported by the shoulder, the panel having opposed broad first and second faces;

at least one beverage dispensing tap tower with a beverage outlet affixed to the panel and extending from the first face with a beverage tower inlet passing through the panel and extending from the second face;

a perforated tray supported in a receiving pan mounted in the first face and disposed so as to be below the beverage outlet of the at least one tap tower;

at least one elongate thermally conductive cooling channel within the insulated chamber below the shoulder having a connection at a first end to the beverage tower inlet and a connection at a second end to a through connector in a side wall for removable connection to a source of beverage under pressure;

the panel constructed so as to be supported on the shoulder in a first operating position in which the at least one tower extends above the open top for dispensing cold beverage when the chamber contains ice to cool the at least one cooling channel and a source of beverage under pressure is connected to the through connector; and the panel constructed so as to be supported on the shoulder in an inverted, second operating position in which the at least one tower extends downward into the chamber where it is protected and so that the insulated top may cover and insulate the chamber for transport.

2. The portable draft bar according to claim 1 further comprising a skirt for removably covering the side walls.

3. The portable draft bar according to claim 2 further comprising an outlet from the receiving pan extending from the second face.

4. The portable draft bar according to claim 1 further comprising an outlet from the receiving pan extending from the second face.

5. The portable draft bar according to claim 1 further comprising an aperture in the panel large enough to permit access to the chamber for retrieving ice and other items from the chamber in cooperation with a removable aperture cover.

6. A portable draft bar comprising:

an insulated chamber having an open top, insulated side walls, and an insulated bottom;

an insulated top for covering the open top;

a horizontal shoulder extending around the inside of the side walls near the open top;

a rigid panel dimensioned to removably fit inside the chamber supported by the shoulder, the panel having opposed broad first and second faces;

at least one beverage dispensing tap tower with a beverage outlet affixed to the panel and extending from the first face with a beverage tower inlet passing through the panel and extending from the second face;

a perforated tray supported in a receiving pan mounted in the first face and disposed so as to be below the beverage outlet of the at least one tap tower;

an outlet from the receiving pan extending from the second face;

a wine box support affixed to the panel and extending from the first face so as to support a tap on the wine box above the perforated tray;

at least one elongate thermally conductive cooling channel within the insulated chamber below the shoulder having a connection at a first end to the beverage tower inlet and a connection at a second end to a through connector in a side wall for removable connection to a source of beverage under pressure;

the panel constructed so as to be supported on the shoulder in a first operating position in which the at least one tower extends above the open top for dispensing cold beverage when the chamber contains ice to cool the at least one cooling channel and a source of beverage under pressure is connected to the through connector; and the panel constructed so as to be supported on the shoulder in an inverted, second operating position in which the at least one tower and wine box support extend downward into the chamber where they are protected and so that the insulated top may cover and insulate the chamber for transport.

7. The portable draft bar according to claim 6 further comprising an aperture in the panel large enough to permit access to the chamber for retrieving ice and other items from the chamber in cooperation with a removable aperture cover.

8. The portable draft bar according to claim 7 further comprising a skirt for removably covering the side walls of the chamber.

* * * * *